INVENTOR.
GERD ROSENSTAND
BY
Nolte & Nolte
ATTORNEYS

INVENTOR.
GERD ROSENSTAND
BY
Nolte & Nolte
ATTORNEYS

INVENTOR.
GERD ROSENSTAND
BY
Nolte & Nolte
ATTORNEYS

INVENTOR.
GERD ROSENSTAND

BY

Nolte & Nolte

ATTORNEYS

Sept. 15, 1970 G. ROSENSTAND 3,529,102
ARRANGEMENT IN HEARING AIDS ESPECIALLY
FOR BEING PLACED IN THE EAR
Original Filed July 22, 1965 5 Sheets-Sheet 5

INVENTOR
GERD ROSENSTAND

BY

Nolte & Nolte
ATTORNEYS

United States Patent Office 3,529,102
Patented Sept. 15, 1970

3,529,102

ARRANGEMENT IN HEARING AIDS ESPECIALLY FOR BEING PLACED IN THE EAR

Gerd Rosenstand, Copenhagen, Denmark, assignor to Danavox International A/S, Copenhagen, Denmark Continuation of application Ser. No. 474,049, July 22, 1965. This application Mar. 21, 1969, Ser. No. 809,436
Claims priority, application Denmark, Mar. 26, 1965, 1,576/65
Int. Cl. H04r *25/02*
U.S. Cl. 179—107 6 Claims

ABSTRACT OF THE DISCLOSURE

A hearing aid having a housing with a plurality of cells, electrical components are received in said cells, a holder and a receiver located in said holder, said holder being arranged for at least partial insertion in the auditory canal and being attached to the housing turnably substantially about the axis of the auditory canal.

This application is a continuation of an application, Ser. No. 474,049 filed July 22, 1965, now abandoned.

The invention relates to an arrangement in hearing aids, especially for being placed in the ear, and where the housing comprises at least two parts.

It is the object of the invention to provide such an arrangement in hearing aids, that the mounting is especially simple and at the same time reliable. This is obtained, according to the invention, thereby, that one or more of the components or component groups of the apparatus are kept in position in the housing by and between the two parts of the housing. Hereby, a substantial part of the mounting will merely be, that the components or component groups in question are placed in the one part, whereafter the other part is put on and secures the components and component groups.

One or more of the components or component groups may, according to the invention, be placed in a cell in the one part, Hereby, the mounting is especially simple, as it is easy to place the components or the component groups in the prescribed manner, and it is not risked, that they will come out of the right position, before the other part of the housing is placed.

In an apparatus, where one or more cell walls consist of a plate element, that is inserted into grooves in the part in question of the housing and is secured by the other part, one or more of such cell walls consisting of plate elements may, according to the invention, have a planar form and be arranged to serve as a contact spring or as contact springs, especially for a battery. Such a planar plate element will give a very reliable contact function, as it will keep its planar form, whereas the common, bent contact springs are apt to change shape as time goes by, so that the contact function may become unreliable.

A microphone may, according to the invention, be supported against the cell walls by means of locally placed yielding pieces, especially at the corners, for instance all eight corners, of a box-formed microphone. Such yielding pieces may, for example, be made of stamped-out foam material, which is cemented to the microphone. Such foam material, that is acquired as sheet material, wherein punching is performed, may be acquired with an exact thickness, so that an exact positioning of the microphone in the cell may be obtained.

The one part may, according to the invention, with an edge part, at the one end, engage an undercut portion, for example a groove on the other part and at the other end be secured to it by means of screws or other detachably means. Thus, convenient and reliably mounting of the housing is achieved.

According to the teachings of the present invention an opening in the housing structure for the microphone is so arranged and compactly constructed whereby the opening is not obstructed by parts of the inner ear when the present hearing aid is inserted in the ear.

According to the invention, the receiver of the apparatus, which is arranged so as to extend totally or partly into the auditory canal, may be placed turnable on an axis in the longitudinal direction of the auditory canal. Hereby, an advantageous possibility for adaption is obtained, as it should be noted, that the cross-sectional shape of the auditory canal is approximately elliptical, and the major axis of the ellipse has a different direction in different human beings, and thus, where a microphone with non-circular sectional shape is uesd, it is of importance, that the microphone can be placed in the right angular position.

In the accompanying drawings there is shown an example of a hearing aid, according to the invention, where FIG. 1 shows a schematical sectional view through the apparatus, FIG. 2 is a perspective view of the base part of the housing, FIG. 3 is a perspective view of the top part of the housing, seen obliquely from above, FIG. 4 is a perspective view of the top part of the housing, seen obliquely from below, FIG. 5 is a perspective view of a battery chamber, FIG. 6 is a perspective view of a holder for a receiver, FIG. 7 is a perspective view of a protection hood for said holder, FIG. 8 is a perspective view of a locking button for said holder, FIG. 9 is a perspective view of a bearing for said holder, FIG. 10 is a contact plate element, FIG. 11 is a perspective view of the housing of the apparatus, FIG. 12 is a view of the apparatus installed in an ear, FIG. 13 is a twisted conduit for the receiver of the apparatus, and FIG. 14 is the same conduit wound helically, FIG. 15 is a microphone housing with adhered foam rubber pads as seen from the side, and FIG. 16 is a view similar to FIG. 15 but in front elevation.

FIG. 17 is a rear plan view of another arrangement of the foam rubber pads on the microphone housing using only four pads;

FIG. 17*a* is a side elevational view thereof;

FIG. 17*b* is a top plan view thereof;

Figure 17:
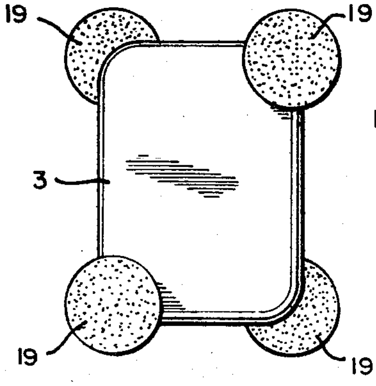
Figure 19:
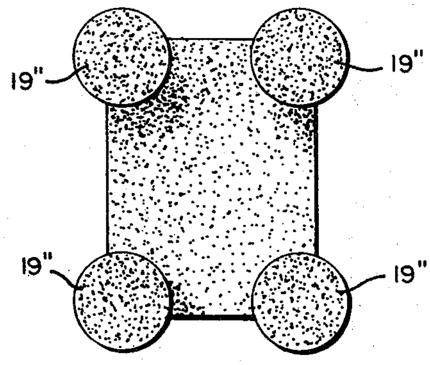
FIG. 19 is a plan view of the microphone housing in which the foam rubber pads are shown integral therewith.
Figure 19A:
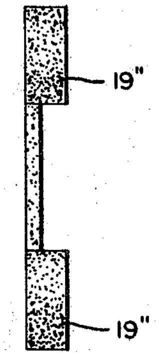
Figure 20:
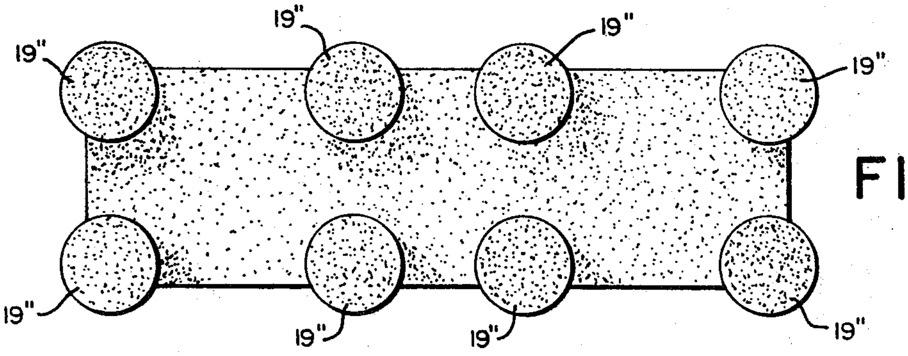
Figure 20A:
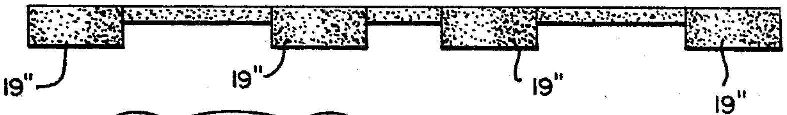

FIG. 19*a* is a side elevational view of FIG. 19;

FIG. 20 is a plan view of a further embodiment of the arrangement shown in FIG. 17;

FIG. 20*a* is a side elevational view of FIG. 20; and

Figure 21:
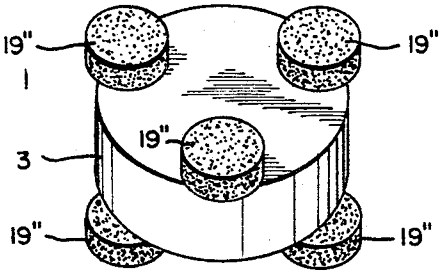

FIG. 21 is another embodiment of the arrangement shown in FIG. 17.

The hearing aid shown in the drawings has a housing comprising a base part 1 and a top part 2. Inside the housing there is placed a michophone 3, a battery 4 and an amplifier 5. In the top part a potentiometer 6 is placed, having a volume control 7.

Figure 1:
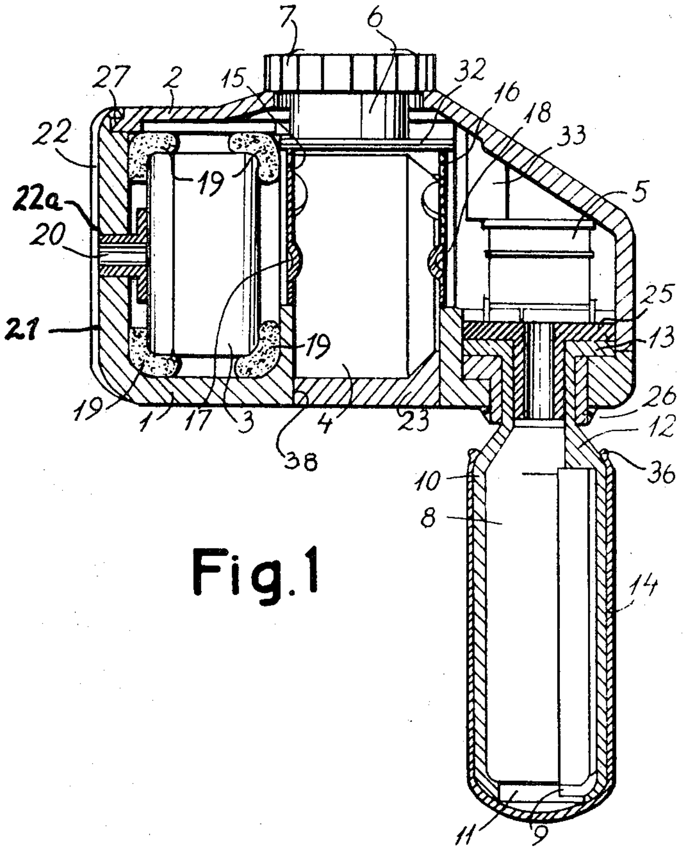
Figure 2:
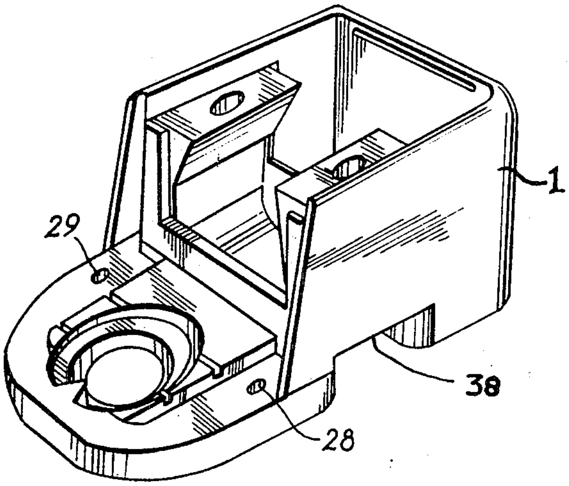
Figures 3, 4:
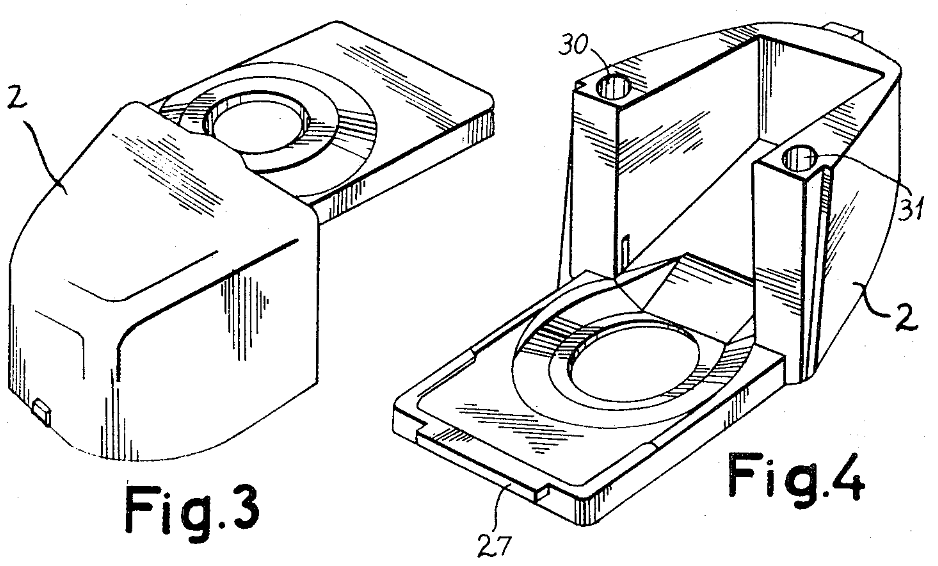
Figure 6:
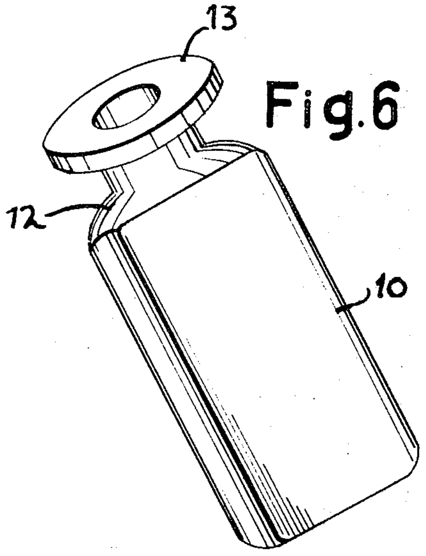
Figure 7:
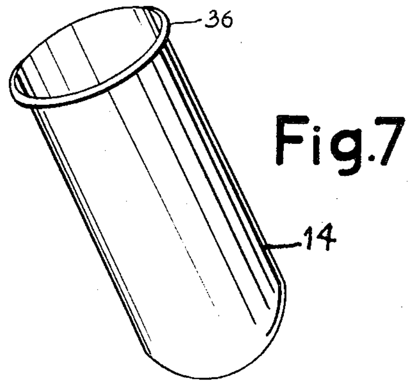

Furthermore, the apparatus has a receiver 8, wherein there is placed a diaphragm (not shown), that extends parallel to the longer sides of the microphone. The space on the one side of the diaphragm is quite low and is, by means of a narrow canal along one of the longer sides, connected with a sound opening 9 at the one end face of the receiver. The receiver is placed in a holder 10 (FIG. 6), made of a yielding material. In one end of the holder is a sound opening 11. At the other end, the holder 10 is a constructed portion in the form of a bottle-neck 12, which is introduced through an opening in the base part 1 and has in the interior a flange 13, whereby the holder 10 is secured to the housing 1, 2 (FIG. 1). Over the holder 10 a bag 14 made of thin membrane material and formed with a tightening ring 36, is distended, said ring tightening against oblique faces of the holder 10, thus holding the bag or hood in its position, so that its bottom tightly bears against the end in question of the holder 10 (FIGS. 1 and 7). The part of the bottom of the bag that covers the sound opening 11 serves partly to prevent foreign matter from penetrating into the receiver 8, and partly acts as a diaphragm for transmitting sound vibrations. The space, which is partitioned by the bottom of the bag and the diaphragm in the receiver, should not be too large.

In grooves, in the side walls of the base part 1, planar plate elements 15 and 16 are placed, each having a small bulge 17, 18, which bear against the sides of the battery 4 and serve as contact members. The plate element 15 makes a partition for a cell for the microphone 3. Said microphone is supported in the cell by means of foam rubber pieces 19, on each of the eight corners of the microphone, said microphone having a sound tube 20 that extends through a suitable opening 20*a* in the side face 21 of the housing. The sound opening leads into a recess 22, which extends upwards along the side face 21 in question and possibly across the top face of the top part 2.

Figure 5:
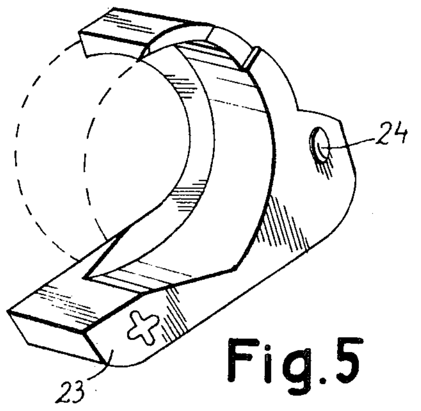
Figure 9:
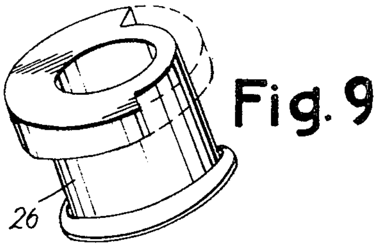
Figure 10:
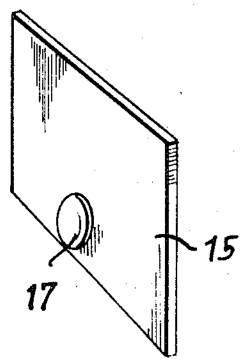
Figure 8:
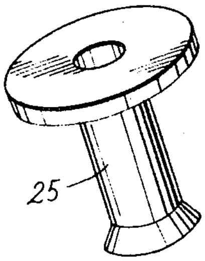
Figure 11:
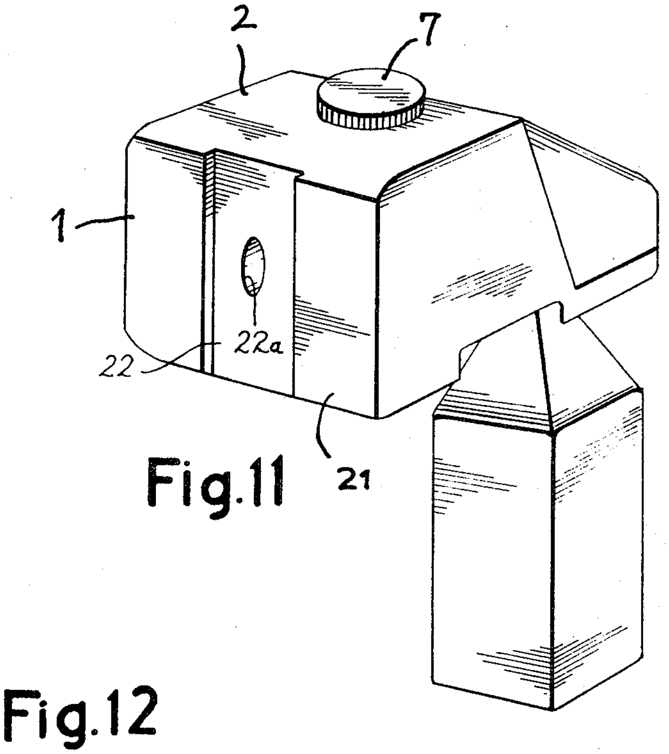
Figure 12:
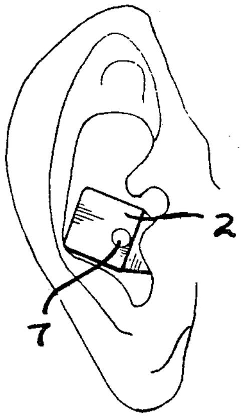

The battery 4 is placed in a cell, that is partitioned by the plate elements 15 and 16, and is supported by a battery holder 23 (FIG. 5), which is pivotably attached by means of a pivot 24 to one side of base part 1 at the bottom portion thereof, so that the battery may, from the shown working position, be swung downwards for the exchange of the battery. A recess 38 is provided in the base part 1 to house the base of the battery chamber 23 when the same is in the working position. The chassis 5 is with outwards projecting edge parts inserted into grooves in the base part 1, and bears on a locking button 25, which has a flange bearing on the flange 13 of the holder 10, which in turn bears on a flange of a bearing 26. By this structure it is achieved, that the housing 10 can be turned in relation to the housing 1, 2. It should be apparent that locking button 25 and bearing 26 clamp the flange 13 of the holder 10 and provide a bearing means that is turnable in the housing. In addition, as seen in FIG. 9, the bearing 26 has a discontinuous flange which is also clearly seen in the right hand side of FIG. 1. The cut-away portions in the flange functions as stop members for the rotatable holder 10 in the housing 1.

The top part 2 has, at the one end, a projecting rib 27, which engages a groove in the side wall in question of the base part 1. At the other end, the top part 2 is secured to base part 1 by means of screws through holes 28 and 29 in the base part and holes 30 and 31 in the top part. Thus, the top part 2 presses the microphone 3 into position in the cell in question in the base part 1. Correspondingly, the top part 2 holds, by means of a plate element 32, whereto the potentiometer 6 is cemented, the plate elements 15 and 16 in position in the base part 1. Furthermore, the top part 2 has a projection 33, that presses on the chassis 5, thus holding it in position. Therefore, when mounting the apparatus, the components in question should merely be placed in the base part and be connected, by the necessary conduits, with each other, whereupon they are fixed by the securing of the top part.

Figure 13:
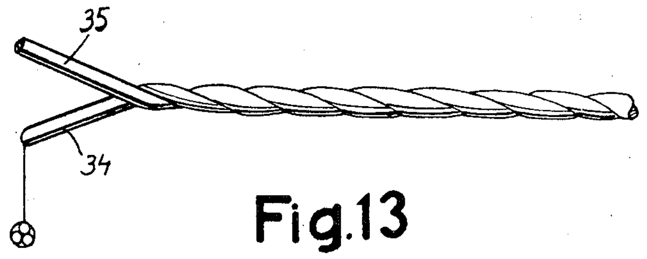
Figure 14:
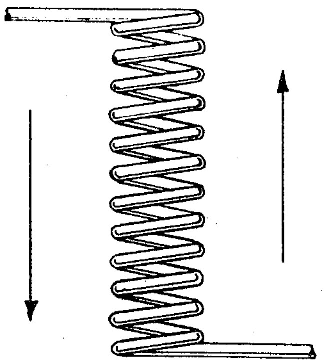

The conduit, shown in FIG. 13, comprises two wires 34 and 35, each comprising three copper wires, having a diameter of 0.030 mm. and 0.0035 mm. insulating varnish, said two wires being twisted together. The two wires are twisted together, as shown, and a wire-diameter of 0.12 mm. is obtained. Thereafter, this wire is wound helically, as shown in FIG. 14, and provides the connection between the chassis 5 and the receiver 8, where it is of great importance that the conduit be extremely flexible.

Figure 15:
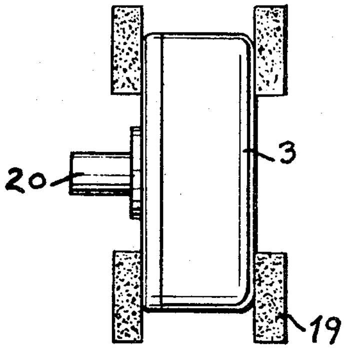
Figure 16:
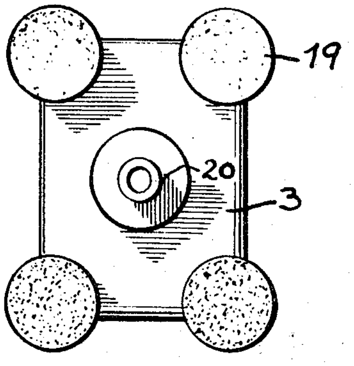

The use of the eight foam rubber discs 19, as shown in FIGS. 15 and 16, for supporting the mircophone 3, is very advantageous. The material hereto may be acquired in the form of sheet material with exact, uniform thickness and in a very soft quality, and the discs are produced therefrom by punching. They are secured to the microphone by means of self-adherent adhesive. If this adhesive is allowed to penetrate into the disc material, this will easily be filled-up to such a degree, that the discs will be les soft than intended, and therefore, special care must be taken to avoid such a penetration. This may be done by using a membrane-part, on which there is placed a layer of self-adherent material, which is connected with the foam rubber sheet, and which is removed before the application of the discs on the microphone.

Figure 17A:
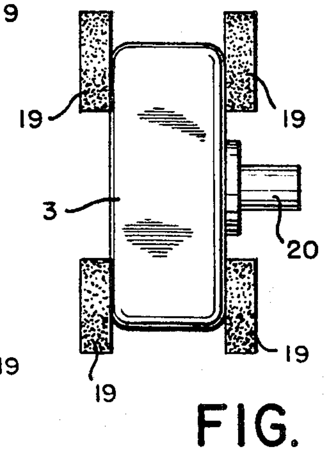
Figure 17B:
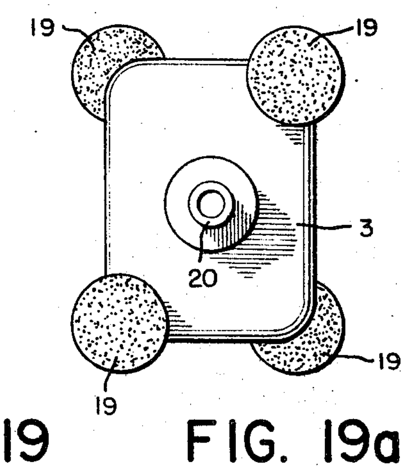
Figure 18:
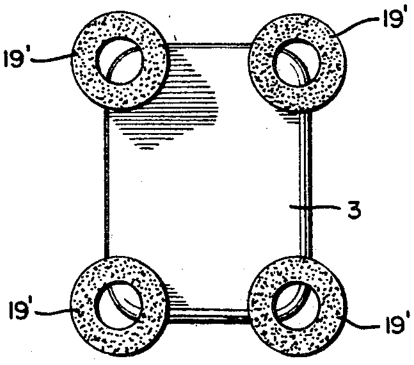
FIG. 18 is a plan view of a futrher arrangement shown in FIG. 17.

The discs 19 can be aranged otherwise than shown. Thus, in a box-shaped microphone, it will, by a suitable dimensioning, be sufficient to place a disc on four of the eight corners, as shown in FIGS. 17, and 17*a*, and 17*b* that is alternately on one and on the other side, so that a suport in all directions is obtained. In the arrangement of the pads it is essential that relatively small members are used, whereby a greater yielding of the support is obtained, and that the placing is done at the corners, whereby it is ensured, that no part of the microphone can come into contact with the walls in the cell. Instead of discs, as shown, rings as shown in FIG. 18 of corresponding magnitude and placed in a corresponding manner may perhaps be used. As it probably may be difficult and time consuming to place the small discs on the microphone, two or more of such discs may be connected with each other to a mounting unit, having thin material between the soft thickenings, which correspond to the discs. Such a mounting unit may, for instance be rectangular corresponding to an end face of the microphone and have a soft thickening 19'' at each of its four corners. However, a mounting unit is conceivable, which is arranged to be bent around and along three or four sides of the microphone and comprises all the necessary thickenings 19'' for the resilient support of the microphone, as shown in FIGS. 20 and 20*a*. Such a mounting may, on its whole extension, have a layer of self-adherent adhesive. Another embodiment is also conceivable, where a strip of foam rubber material is cemented along each of the four corners of the microphone. Also round microphones can be supported by means of soft discs 19, which may be connected with each other to form a mounting unit, as shown in FIG. 21. As the corners of a microphone ususally are rounded, the plate material will bend about these roundings, whereby one and the same thickening provides for the support on three side faces.

In FIG. 1 the bottom of the bag 14 is shown as being curved downwards, but in practise the bag is drawn upwards so that the bottom will be planar bearing against the bottom of the holder 10.

The shown and described embodiment is only to be considered as an example, as numerous variations are conceivable within the scope of the invention.

I claim:

1. In a hearing aid designed to be placed in an ear the arrangement comprising in combination a housing having a plurality of wall means defining a plurality of cells, a microphone located in one of said cells, a battery located in another of said cells, and an amplifier located in still another of said cells; a holder having wall means also defining a cell; a receiver located in said cell of said holder, electrical connecting means connecting said microphone, said battery, said amplifier and said receiver, said holder being designed to be inserted at least partially in the auditory canal of the ear, said holder having a flange at the end thereof adjacent to said amplifier, a bearing in said housing engaging one surface of said holder flange, and a locking button engaging the opposite surface of said holder flange whereby said holder is capable of being turned relative to said housing and about an axis which is substantially parallel to the axis of the auditory canal.

2. An arrangement for a hearing aid as set forth in claim 1 wherein said holder has a noncircular construction, and said flange is a circular flange.

3. An arrangement for a hearing aid as set forth in claim 1 wherein said holder is at least in part made of yielding material whereby said holder is also pivotable in relation to said housing in directions which are substantially perpendicular to the axis of the auditory canal.

4. An arrangement for a hearing aid as set forth in claim 1 wherein said housing consists of a top part and a bottom part and said microphone has plane walls and end portions with a plurality of corners, also comprising, holding means for joining said top part and said bottom part and a plurality of yieldably resilient support pieces, said support pieces being locally arranged on end portions of said microphone to cover at least four corners thereof when said microphone is inserted in said cell, and said locally arranged support pieces hold the microphone suspended in said cell away from said wall means and said plane walls of the microphone are maintained free of contact with said support pieces.

5. An arrangement for a hearing aid is set forth in claim 1 wherein said housing has an endface provided with a groove and an opening leading from one of said cells into said groove, said microphone having an opening which communicates with said opening in said endface when said microphone is located in said cell, the axis of said groove being substantially parallel to the axis of the auditory canal, when said holder is inserted therein said opening of the microphone being connected to the opening in said endface without a space therebetween.

6. An arrangement for a hearing aid as set forth in claim 1 wherein one of said wall means defiing said cell for the battery is a plate-shaped element provided with a projection on one of its sides, said plate-shaped element being slidably movable into and out of an operating position in said housing, said projection making contact with said battery when said plate-shaped element is in said operating position and said battery is positioned in said cell.

References Cited

FOREIGN PATENTS 1,126,929 4/1962 Germany.

KATHLEEN H. CLAFFY, Primary Examiner

T. L. KUNDERT, Assistant Examiner